United States Patent
Asai

[19]

[11] Patent Number: 5,882,700
[45] Date of Patent: Mar. 16, 1999

[54] MOLD FOR MOLDING DISK, HAVING AIR PASSAGES FOR BLOWING COMPRESSED AIR TO FACILITATE REMOVAL OF MOLDED DISK

[75] Inventor: Ikuo Asai, Nagoya, Japan

[73] Assignee: Kabushiki Kaisha Meiki Seisakusho, Japan

[21] Appl. No.: 944,766

[22] Filed: Oct. 6, 1997

[30] Foreign Application Priority Data

Nov. 28, 1996 [JP] Japan .................................. 8-317325

[51] Int. Cl.$^6$ .................................................. B29C 45/43
[52] U.S. Cl. ......................... 425/556; 425/437; 425/810
[58] Field of Search ................................... 425/556, 810, 425/437; 264/106

[56] References Cited

U.S. PATENT DOCUMENTS

| | | | |
|---|---|---|---|
| 4,979,891 | 12/1990 | Kitamura | 425/437 |
| 5,092,758 | 3/1992 | Tanak et al. | 425/422 |
| 5,297,951 | 3/1994 | Asai | 425/556 |
| 5,460,763 | 10/1995 | Asai | 264/107 |
| 5,593,710 | 1/1997 | Asai | 425/552 |
| 5,626,890 | 5/1997 | Asai | 425/556 |
| 5,720,994 | 2/1998 | Asai | 425/556 |

*Primary Examiner*—James P. Mackey
*Attorney, Agent, or Firm*—Parkhurst & Wendel

[57] ABSTRACT

A mold for molding a disk substrate includes a stationary mold half having a first molding surface and a movable mold half having a second molding surface, which cooperate with each other to define therebetween a mold cavity. Each of at least one of the stationary and movable mold halves has at least one air supply passage for supplying compressed air, and a plurality of air blow passages having respective air inlets in communication with the at least one air supply passage and respective air outlets open to the mold cavity at respective circumferential positions of the mold cavity about a centerline of the mold, for introducing the compressed air from the air supply passage into the mold cavity, to facilitate removal of the molded substrate from the corresponding mold half or halves. The air supply passage and the air blow passages cooperate to provide a plurality of air passages ending at the air outlets which have a substantially same resistance to a flow of the compressed air therethrough.

7 Claims, 6 Drawing Sheets

MOLD FOR MOLDING DISK, HAVING AIR PASSAGES FOR BLOWING COMPRESSED AIR TO FACILITATE REMOVAL OF MOLDED DISK

The present invention is based on Japanese Patent Application No. 8-317325 filed Nov. 28, 1996, the content of which is incorporated hereinto by reference.

CROSS REFERENCE TO RELATED APPLICATIONS

Not Applicable.

BACKGROUND OF THE INVENTION

1. Field of the Invention

The present invention relates in general to techniques associated with a mold for molding a disk, more precisely, a substrate of a compact disk (CD), a digital video disk (DVD), a magneto-optical disk, a phase-changing optical disk, or the like. More particularly, this invention is concerned with a mold which is provided with a plurality of air blow passages through which a stream of compressed air is introduced into a mold cavity, to facilitate removal of a molded disk substrate from the mold.

2. Discussion of the Related Art

There have recently been used optical disks and other disks as a data storage medium in various fields of the art. Disk substrates used for producing these disks are produced by a known mold, for example, by using a mold including a stationary mold half and a movable mold half, both of which have respective molding surfaces cooperating to define therebetween a mold cavity. The stationary and movable mold halves are brought to a closed position to define the mold cavity, and a material of the disk substrate is injected into the mold cavity. As a result, the disk substrate is molded. Then, the stationary and movable mold halves are brought to an open position, while the molded disk substrate is retained on the molding surface of one of the stationary and movable mold halves. The molded disk substrate is removed from the mold half by using a suitable mechanism, such as a mechanical ejector and an air blow device. Thus, the desired disk substrate is produced. The air-blow device is adapted to supply compressed air to the mold cavity for facilitating removal of the molded disk substrate from the mold cavity. This device is effective not only to aid the mechanical ejector to remove the molded disk substrate, but also to prevent local damage or deterioration or local sticking of the disk substrate in the process of cooling of the material in the mold cavity. Hence, the air blow device is preferably employed.

The air blow device is generally provided for at least one of the stationary and movable mold halves such that an air passage is open on the molding surface of the stationary or movable mold half, at two or more outlets located at the suitable circumferential positions of the mold half. To facilitate the removal of the molded disk substrate from the mold half, compressed air is fed into the mold cavity through the air outlets open on the molding surface of the mold half.

An extensive study of the air blow device by the present inventor revealed that the quality of the disk substrate is influenced by arrangement of the air blow device. Especially, the production. of the disk substrate used for a DVD which has a relatively thin thickness in comparison with those of a CD and a CD-ROM is significantly influenced by the arrangement of the air blow device. For instance, the molded disk substrate suffers from bending or buckling due to inadequate air blows, resulting in an increased ratio of reject of the molded disk substrate.

A further study of the known air blow device in an effort to solve the above-described problem revealed that a variation of pressure of the compressed air injected from the air outlets may cause partial or local sticking of the molded disk substrate to the molding surface upon removal thereof from the mold half, so that the corresponding local area of the molded disk substrate tends to be bent or buckled, and otherwise deteriorated.

SUMMARY OF THE INVENTION

It is therefore an object of the present invention to provide a mold for molding a substrate of a disk, which is capable of producing the disk substrate with a desired quality, while preventing occurrence of surface deterioration and buckling or other deformation of the substrate due to variation of pressure of compressed air applied through the air outlets to the molded product.

The object of the present invention may be achieved according to the principle of this invention, which provides a mold for molding a substrate of a disk, comprising: a stationary mold half having a first molding surface; and a movable mold half movable relative to the stationary mold half and having a second molding surface cooperating with the first molding surface to define therebetween a mold cavity. Each of at least one of the stationary and movable mold halves has at least one air supply passage for supplying compressed air and a plurality of air blow passages having respective air inlets in communication with the at least one air supply passage and respective air outlets open to the mold cavity at respective circumferential portions of the mold cavity about a centerline of the mold, for introducing the compressed air from the at least one air supply passage into the mold cavity, to facilitate removal of the molded substrate from the at least one of the stationary and movable mold halves. The at least one air supply passage and the air blow passages cooperate to provide a plurality of air passages ending at the air outlets. The plurality of air passage have a substantially same resistance to a flow of the compressed air therethrough.

In the mold constructed according to the present invention, the pressure of the compressed air introduced into the mold cavity through air blow passages is effectively made even at the air outlets which are spaced from each other in the circumferential direction of the mold cavity or mold. That is, the compressed air injected from the air outlets of the plurality of air blow passages provides a substantially constant force acting on the surface of the molded disk substrate at each of the air outlets, so that undesired concentration of the compressed air pressure on local areas of the surface of the disk substrate may be effectively eliminated, by suitable positioning of the air outlets of the air blow passages, making it possible to prevent local sticking of the molded disk substrate to the molding surface and bending or buckling of the molded disk substrate.

The number of the air blow passages is not specifically limited, but is preferably four or more. More preferably, these air blow passages are disposed such that the air outlets are evenly or equiangularly spaced from each other in the circumferential direction about the centerline of the mold or mold cavity.

According to a first preferred form of the present invention, each of the above-indicated at least one of the stationary and movable mold halves has a circumferential communication channel communicating with an open end of each of the at least one air supply passage and the air inlets of the air blow passages, for thereby connecting the at least one air supply passage to the air blow passages. The air inlets are arranged in a circumferential direction of the circumferential communication channel such that the air inlets have a same circumferential distance from the open end of one of the at least one air supply passage.

In the mold constructed according to the above first preferred form of the present invention, the compressed air supplied through the air supply passage or passages is fed to the air blow passages through the circumferential communication channel. Described in detail, the air inlets at which the air blow passages communicate with the communication channel have the same circumferential distance from the open end of one of the at least one air supply passage in the circumferential direction of the channel. Therefore, all of the air passages ending at the air outlets have the same resistance of flow of the compressed air therethrough, whereby the pressure of the compressed air injected through the air blow passages is made constant at the different air outlets open to the mold cavity.

The number of the at least one air supply passage connected to the communication channel is not specifically limited. If more than three air blow passages are formed through the stationary or movable mold half, a plurality of air supply passages may be preferably provided in the corresponding mold half, and communicate at their open ends with the communication channel, such that the open end of each air supply passage is spaced from the adjacent air inlets of the air blow passage by the same distance in the circumferential direction of the communication channel. These air blow passages and the communication channel are dimensioned to have the same cross sectional area so that all of the air passages ending at the air outlets have the same overall flow resistance.

In the present first preferred form of the mold, the air inlets of the air blow passages may be positioned along the communication channel with respect to the open end of each air supply passage such that the air inlets adjacent to the open end of one of the at least one air supply passage have the same distance from that open end in the circumferential direction of the communication channel. This arrangement permits even distribution of pressure of the compressed air injected from the air outlets of the air blow passages. More preferably, the air inlets of the air blow passages and the open ends of the air supply passages are positioned along the communication channel such that all of the air inlets have the same sum of the circumferential distances from all of the open ends of the air supply passages. This arrangement is more effective for uniform distribution of pressure of the compressed air at the different air outlets of the air blow passages.

In one advantageous arrangement of the above first preferred form of the present invention, the air inlets of the air blow passages are equally spaced from each other in the circumferential direction, and the open end of each of the at least one air supply passage is located intermediate between adjacent ones of the air inlets.

The air supply passages may communicate with respective divisions of the circumferential communication channel which are defined by the air inlets of the air blow passages, or alternatively with every other divisions. In this arrangement, the air inlets of all the air blow passages have the same sum of the circumferential distances from the open end of all the air supply passages. Thus, the compressed air is evenly injected through the air blow passages with high stability. When an even number of air blow passages are provided in the mold half, the open ends of the air supply passages may be open at the respective circumferential portions of the communication channel defined by the adjacent air inlets, or may be open at the every other circumferential portions defined by the adjacent air inlets. When an odd number of air blow passages are provided in the mold half, on the other hand, the open ends of the air supply passages are open at the respective circumferential portions of the communication channel. In both cases, the open ends of the air supply passages are equally spaced from each other in the circumferential direction of the communication channel.

Preferably, the circumferential communication channel is coaxial with the mold cavity, and the air inlets of the air blow passages are equiangularly spaced from each other in the circumferential direction of the communication channel. In this arrangement, the compressed air may be effectively applied to the molded disk substrate, while avoiding a variation of the pressure of the compressed air in the circumferential direction of the disk substrate.

According to a second preferred form of the present invention, each of the at least one of the stationary and movable mold halves has a circumferential communication channel communicating with an open end of each of the at least one air supply passage and the air inlets of the air blow passages, for thereby connecting the at least one air supply passage to the air blow passages, and at least one of the air blow passages has a flow restrictor for restricting a flow of the compressed air through each of the at least one of the air blow passages.

In the mold constructed according to the second preferred form of the invention described above, the flow resistance of the compressed air of each air blow passage having the flow restrictor can be adjusted by means of the flow restrictor, relative to that of the other air blow passages. The air passages ending at the air outlets of the air blow passages may have different air flow resistances due to a difference of the circumferential distances between the open end of each air supply passage and the air inlets of the air blow passages, and a difference of length of the air blow passages. In this case, the overall flow resistance of the compressed air flowing through the air supply passage and the air blow passages can be adjusted by the flow restrictor or restrictors provided for the air blow passage or passages, to compensate for the difference of the flow resistance values of the air passages ending at the air outlets. Thus, the compressed air can be injected under the same pressure at the different air outlets of the air blow passages.

To more effectively equalize the pressure of the compressed air injected through the air blow passages, the flow restrictors are preferably provided for all the air blow passages the flow resistances of which are different from the nominal value. The flow restrictors can be provided for all of the air blow passages, so as to adjust the distribution of the compressed air pressure at the air outlets.

In one advantageous arrangement of the above second preferred form of the present invention, the flow restrictor may be manually operable to adjust the air flow resistance of the corresponding air blow passage.

Namely, each flow restrictor may have a predetermined constant air flow resistance, but may preferably be arranged to manually operable to adjust the flow resistance of the corresponding air blow passage. In the latter arrangement, the pressures of the compressed air injected from the air blow passages can be effectively controlled, depending upon the specific configuration of the air passages. In the former arrangement, the flow restrictor for a given air blow passage may be changed to change the air flow resistance of that air blow passage.

According to a third preferred form of the present invention, one of the stationary and movable mold halves includes an annular outer stamper holder for holding a radially outer portion of an annular stamper to be set on one of the first and second molding surfaces which corresponds to the one of the stationary and movable mold halves. The annular outer stamper holder has the plurality of air blow passages and cooperates with a radially outer portion of the one of the first and second molding surface to define an annular air chamber to which the air outlets of the air blow passages are open. The annular outer stamper holder cooperates with an exposed surface of the stamper to define therebetween a circumferential clearance communicating with a radially inner end of the annular air chamber, whereby the compressed air injected from the air outlets into the air chamber is fed to the exposed surface of the stamper through the circumferential clearance.

In the mold constructed according to the third preferred form of the present invention, the compressed air is effectively applied to the radially outer portion of the surface of the molded disk substrate, facilitating the removal of the the molded disk substrate from the corresponding mold half, so as to improve the quality of the molded disk substrate. That is, the compressed air introduced into the air blow passages is fed to the exposed surface of the stamper through the annular air chamber partially defined by the annular outer stamper holder, so that pressure of the compressed air may be equalized in the circumferential direction of the annular stamper. This arrangement is effective to assure improved stability in removing the molded disk substrate from the mold, with even distribution of the removal force based on the air pressure.

BRIEF DESCRIPTION OF THE DRAWINGS

The above and other objects, features, advantages and technical and industrial significance of the present invention will be better understood by reading the following detailed description of presently preferred embodiments of the invention, when considered in connection with the accompanying drawings, in which.

DETAILED DESCRIPTION OF THE PRESENT EMBODIMENT

Figure 1:
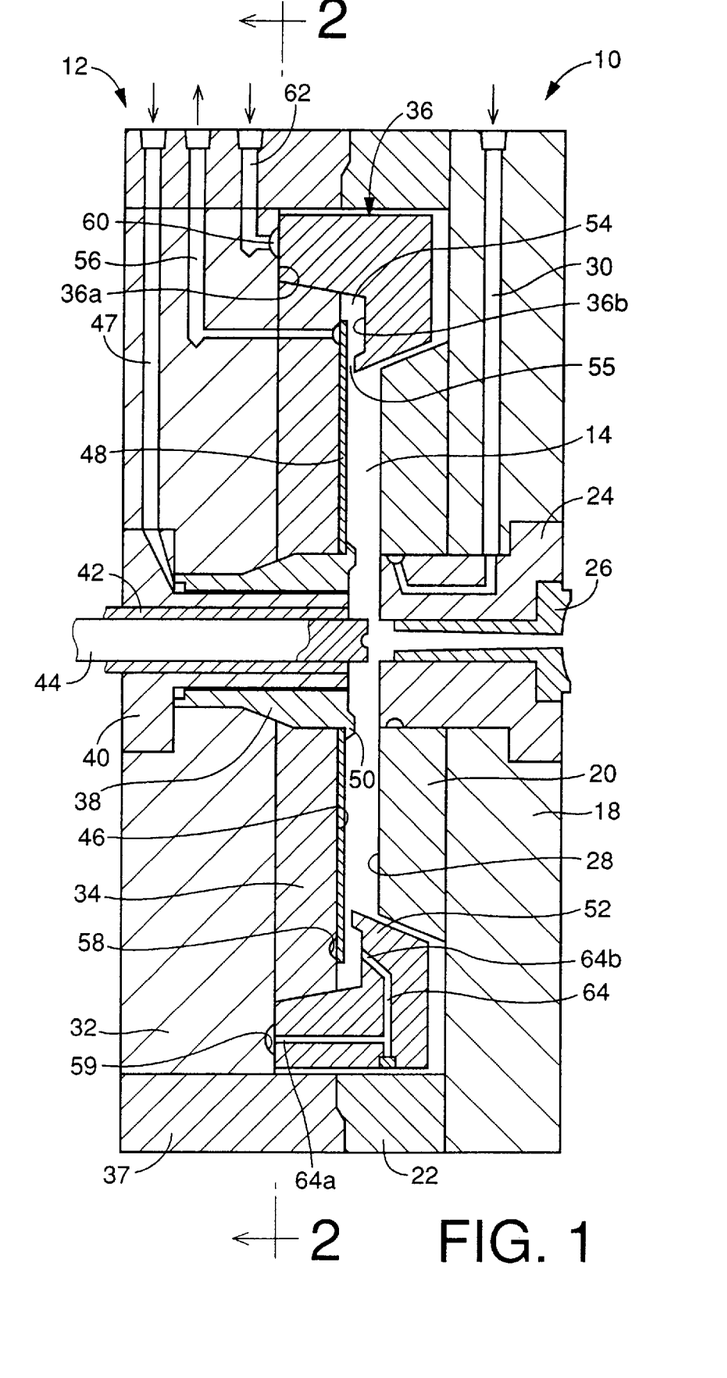
FIG. 1 is a vertical cross sectional view taken along a line of 1—1 of FIG. 2 of a mold for molding a substrate of a disk, which is constructed according to one preferred embodiment of this invention.

Referring first to FIG. 1, there is shown a mold for molding a substrate of an optical disk. The mold has a stationary mold half 10 and a movable mold half 12. The stationary mold half 10 is attached to a stationary member of a mold clamping device (not shown), while the movable mold half 12 is attached to a movable member of the mold clamping device. The movable member of the mold clamping device is moved toward and away from the stationary member, so that the movable mold half 12 is moved toward and away from the stationary mold half 10. Thus, the mold has an open position and a closed position.

In the closed position of FIG. 1 in which the stationary and movable mold halves 10, 12 are located close to each other, there is defined a mold cavity 14 therebetween having a thin-plate shape, for forming the disk substrate. That is, the mold cavity 14 is filled with a synthetic resin material, which is cooled to be solidified in the mold cavity 14, whereby the disk substrate is produced.

More specifically described, the stationary mold half 10 includes a stationary base plate 18 to which are fixed an annular stationary mirror block 20 having a relatively large wall thickness and an annular mirror surface at its axial end, and an annular stationary abutting block 22 such that the stationary mirror block 20 is disposed on a radially center portion of one of the opposite axial end faces of the stationary base plate 18, while the stationary abutting block 22 is disposed on a radially outer or peripheral portion of the corresponding axial end face of the stationary base plate 18. The stationary base plate 18 and mirror block 20 have center bores in which is received an outer bushing 24. The outer bushing 24 has a center bore in which is received a sprue bushing 26. The inner edge of the axial end of the outer bushing 24 on the side of the mirror block 20 serves as a female cutter, which cooperates with a male cutter 44 described below, to remove a central portion of the disk substrate.

The stationary mold half 10 has a first molding surface 28, which is provided by the mirror surface of the stationary mirror block 20 and the corresponding axial end face of the outer bushing 24. Inside the stationary base plate 18 and the stationary mirror block 20, there is formed a first air passage 30 communicating with an annular gap between the contacting surfaces of the stationary mirror block 20 and the outer bushing 24. This annular gap opens on the first molding surface 28, so that a stream of compressed air which is supplied through the first air passage 30 is fed to the first molding surface 28 through the gap.

The movable mold half 12 includes a movable base plate 32 to which there are fixed by screws an annular movable mirror block 34 having a relatively large wall thickness and an annular mirror surface at its axial end, and an outer stamper holder 36 in the form of a ring, such that the movable mirror block 34 is disposed on a radially center portion of one of the opposite axial end faces of the movable base plate 32, while the outer stamper holder 36 is disposed on a radially outer portion of the corresponding axial end face of the movable base plate 32. The outer stamper holder 36 has a radially outer annular surface 36a which is in contact with the movable base plate 32, and a radially inner annular surface 36b which faces the mirror surface of the movable mirror block 34. The movable mold half 12 further includes a cylindrical movable abutting block 37 having a relatively large wall thickness, which is disposed radially outwardly of and fixed to the outer circumferential surface of the movable base plate 32. The movable abutting block 37 protrudes from the axial end face of the movable base plate 32 toward the stationary mold half 10 by a predetermined distance in the axial direction of the movable mold half 12. The protruding axial end face of the abutting block 37 abuts on the corresponding axial end face of the abutting block 22 when the movable mold half 12 is moved toward the stationary mold half 10, so that the stationary and movable mold halves 10, 12 are axially positioned relative to each other to establish the closed position of the mold.

The movable base plate 32 and mirror block 34 have center bores in which an inner stamper holder 38 having a generally cylindrical shape is accommodated and fixed thereto by screws or other suitable fasteners. The inner stamper holder 38 has a center bore in which is received a stationary guide sleeve 40 fixed to the movable base plate 32. The stationary guide sleeve 40 has a center bore in which an ejector sleeve 42 is slidably movably received so that it is guided by the inner surface of the stationary guide sleeve 40. The ejector sleeve 42 has a center bore in which is axially slidably received the above-indicated male cutter sleeve 44, which cooperates with the female cutter (outer bushing 24) of the stationary mold half 10 to remove the central portion of the molded disk substrate, for thereby forming a center hole in the disk substrate. The ejector sleeve 42 and the male cutter sleeve 44 are axially reciprocated by a suitable drive mechanism by a predetermined distance.

The movable mold half 12 has a second molding surface 46, which is provided by the annular mirror surface of the movable mirror block 34 and the axial end faces of the inner stamper holder 38, stationary guide sleeve 40 and ejector sleeve 42 that are disposed radially inwardly of and concentrically or coaxially with the movable mirror block 34. Inside the abutting block 37, the movable base plate 32 and the stationary sleeve 40, there is formed a second air passage 47 communicating with an annular gap between the contacting surface of the inner stamper holder 38 and the stationary sleeve 40. The annular gap opens on the second molding surface 46, so that a stream of compressed air supplied through the second air passage 47 is fed to the second molding surface 46 through the annular gap.

On the mirror surface of the movable mirror block 34 which partially defines the second molding surface 46, there is placed an annular stamper 48 which has an information bearing surface on which information in the form of pits or the like is stored. The stamper 48 is fixed on the second molding surface 46 such that the inner and outer peripheries of the stamper 48 are clamped by the inner and outer stamper holders 38, 36, respectively. More specifically described, the inner stamper holder 38 has an integrally formed annular retainer portion 50 at its axial end, which extends in the radially outward direction, so that the annular retainer portion 50 is disposed opposite to a radially inner peripheral portion of the mirror surface of the movable mirror block 34, with a certain axial spacing therebetween, for holding the inner periphery of the stamper 48 onto the mirror surface of the movable mirror block 34. On the other hand, the outer stamper holder 36 has an integrally formed annular retainer portion 52 extending in the radially inward direction and having the radially inner annular surface 36b. The retainer portion 52 is disposed opposite to a radially outer peripheral portion of the mirror surface of the movable mirror block 34, with a certain axial spacing therebetween, for holding the outer periphery of the stamper 48 onto the mirror surface of the movable mirror block 34.

The radially outer portion of the mirror surface of the movable mirror block 34, cooperates with the annular retainer portion 52 of the outer stamper holder 36 to define an annular air chamber 54 formed therebetween. In the radially outer portion of the mirror surface of the movable mirror block 34, there is formed a circumferential groove 58. Through the abutting block 37, the movable base plate 32 and the movable mirror block 34, there is formed a third air passage 56 communicating with the circumferential groove 58, so that the third air passage 56 is connected to the annular air chamber 54 through the circumferential groove 58. The opening of the circumferential groove 58 is closed by the radially outer portion of the stamper 48, which extends into the air chamber 54, so that the stamper 48 is attracted to the second molding surface 46 at its radially outer portion by air suction applied thereto through the third air passage 56 and circumferential groove 58.

Figure 2:
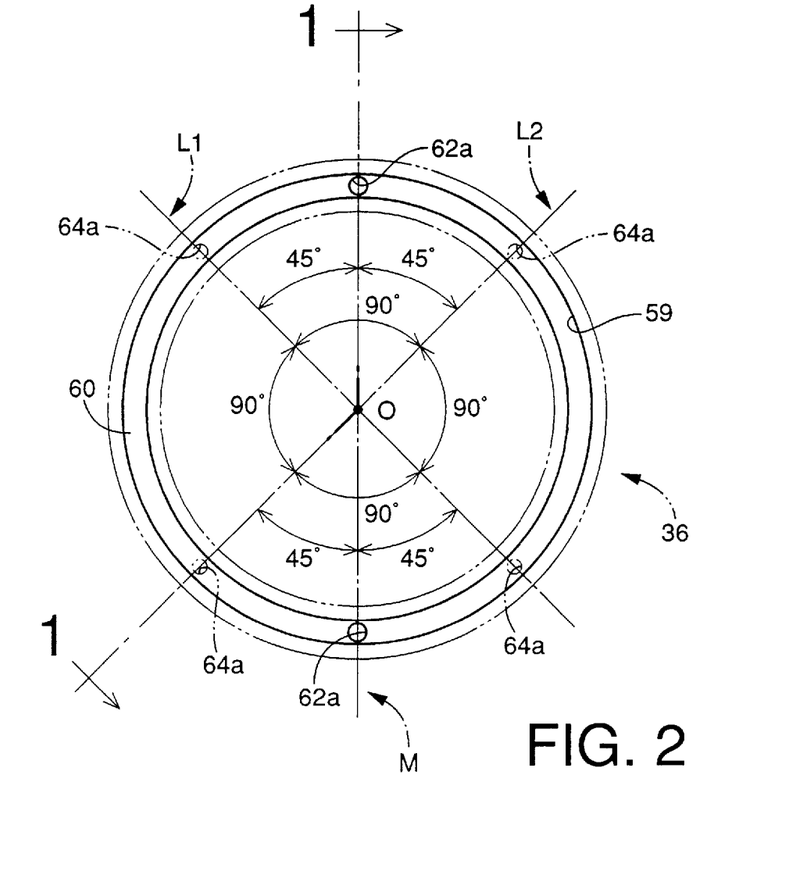
FIG. 2 is a schematic view in cross section taken along a line 2—2 of FIG. 1.

In the radially outer portion of the axial end face of the movable base plate 32, there is formed a circumferential groove 59, which is closed by the radially outer annular surface 36a of the outer stamper holder 36, so that there is provided a circumferential communication channel 60 which extends in the circumferential direction with a constant cross sectional area, at an interface between the movable base plate 32 and the outer stamper holder 36. Through the movable abutting block 37 and the movable base plate 32, there are formed air supply passages in the form of two fourth air passages 62 communicating with the communication channel 60, as shown in FIG. 2. The outer stamper holder 36 has four air blow passages 64. Each air blow passage 64 has an air inlet 64a open on the radially outer annular surface 36a and an air outlet 64b open on the radially inner annular surface 36b. These four air blow passages 64 are spaced from each other in the circumferential direction of the outer stamper holder 36, such that the air inlets 64a of the air blow passages 64 are open to the annular communication channel 60 at the respective four circumferential portions, while the air outlets 64b of the air blow passages 64 are open to the annular air chamber 54 at the respective four circumferential positions. A stream of compressed air supplied through the fourth air passages 62 is fed to the air blow passages 64 through the communication channel 60 and injected into the air chamber 54 at the respective air outlets 64b. The compressed air flows from the air chamber 54 onto the information bearing surface of the stamper 48 through a circumferential clearance 55 or gap between the outer circumferential surface of the stamper 48 and the annular retainer portion 52 of the outer stamper holder 36.

A desired disk substrate is produced by molding using the stationary and movable mold halves 10, 12 constructed as described above, according to the following procedure, for example. Initially, the stamper 48 is fixed to the movable mold half 12 by means of the inner stamper holder 38 and the outer stamper holder 36, while being attracted to the second molding surface 46 by air suction applied thereto through the third air passage 56 which is connected to a suitable vacuum pump. Then, the movable mold half 12 is moved toward the stationary mold half 10 to the closed position of the mold, to thereby define the mold cavity 14 therebetween. A suitable resin material for molding the disk substrate is injected into the mold cavity 14 through the sprue bushing 26 disposed in the stationary mold half 10 and connected to a nozzle of an injecting device (not shown).

The resin material injected into the mold cavity 14 is cooled and solidified, whereby the desired disk substrate is molded. More specifically described, after the mold cavity is filled with the resin material, the male cutter sleeve 44 disposed in the movable mold half 12 is moved toward the stationary mold half 10 and advanced into the center bore of the outer bushing 24 serving as the female cutter, whereby a center hole is cut in the molded disk substrate. After a predetermined period of time has passed, the movable mold half 12 is moved away from the stationary mold half 10 with the molded disk substrate fixed thereto. Then the ejector sleeve 42 is moved toward the stationary mold half 10 to remove the molded disk substrate from the movable mold half 12, whereby the desired disk substrate is produced.

Upon opening the mold after the disk substrate is molded with the mold placed in the closed position, the compressed air is fed to the first molding surface 28 through the first air passage 30. In this arrangement, the molded disk substrate is effectively removed from the stationary mold half 10, while it is held on the second molding surface 46 of the movable mold half 12. To facilitate removal of the molded disk substrate from the movable mold half 12, the compressed air is fed to the second molding surface 46 through the second air passage 47, so that a suitable pressure is applied to a radially inner portion of the molded disk substrate, thereby aiding the ejector sleeve 42 to remove the molded disk substrate. In addition, the compressed air supplied through the two fourth air passages 62 is fed into the air blow passages 64 through the communication channel 60 and is introduced into the annular air chamber 54. The compressed air supplied to the annular air chamber 54 is then fed to the information bearing surface of the stamper 48, through the clearance 55 between the annular retainer portion 52 of the outer stamper holder 36 and the stamper 48, so that a suitable pressure is applied to the radially outer portion of the molded disk substrate, to aid the ejector sleeve 42 to remove the molded disk substrate. The compressed air supplied through the second and fourth air passages 47, 62 may be fed into the mold cavity 14 not only upon removing the molded disk substrate from the movable mold half 12 after the mold is opened, but also upon opening of the mold after the material injected into the mold cavity 14 has been solidified to some extent.

Referring next to FIG. 2, there are shown the four air inlets 64a which are open at the respective circumferential portions of the radially outer annular surface 36a of the outer stamper holder 36, namely, open to the annular communication channel 60 at the respective four circumferential positions, such that the four air inlet holes 64a are equiangularly spaced from each other in the circumferential direction of the radially outer annular surface 36a. More specifically described, the four air inlets 64a are located at the respective four points of intersection between the circumferential communication channel 60 and two straight lines L1 and L2 which pass a centerline or axis 0 of the mold or mold cavity 14 and which are perpendicular to each other, lying in a plane parallel to the first and second molding surfaces 28, 46. The two air passages 62 communicate at respective open ends 62a thereof with the circumferential communication channel 60. The open ends 62a, 62a are located at respective points of intersection between the communication channel 60 and a straight line M which passes the centerline 0 and which is at 45° with respect to the straight lines L1, L2. This straight line M also lies in the above-indicated plane.

In this arrangement, the open ends 62a of the two fourth air passages 62 are equally spaced from the adjacent air inlets 64a in the circumferential direction of the communication channel 60. That is, each of the four air inlets 64a is equiangularly spaced by 45° from one of the two open ends 62a of the fourth air passages 62, and 135° from the other open end 62a, in the opposite circumferential directions. This arrangement assures that two air inlets 64a adjacent to the corresponding open end 62a has the same sum of distances from the two open ends 62a in the circumferential direction of the channel 60.

In the present arrangement of the two fourth air passages 62, circumferential communication channel 60 and four air blow passages 64, the compressed air is delivered to the air outlets 64b of the four air blow passages 64 over the same total flow distance, and with the same flow resistance.

Therefore, the compressed air supplied through the air passages 62, 64 is fed to the radially outer portion of the molded disk substrate at a constant air pressure at the four air outlets 64b, at which the four air blow passages 64 are open to the annular air chamber 54 at the respective circumferential positions of the radially inner surface 36b of the outer stamper holder 36. The compressed air is evenly and stably applied to the surface of the disk substrate, so that pressure concentration on particular local areas of the surface of the disk substrate is effectively avoided, resulting in preventing partial sticking of the molded disk substrate to the stamper 48 and bending or buckling of the molded disk substrate.

In the present embodiment, the compressed air which is evenly introduced from the four air blow passages 64 into the annular air chamber 54, is fed to the information bearing surface of the stamper 48 through the circumferential clearance 55. Thus, the compressed air can be uniformly applied to the molded disk substrate over its entire circumference, so that the partial sticking and bending of the molded disk substrate are more effectively prevented.

Figure 3:
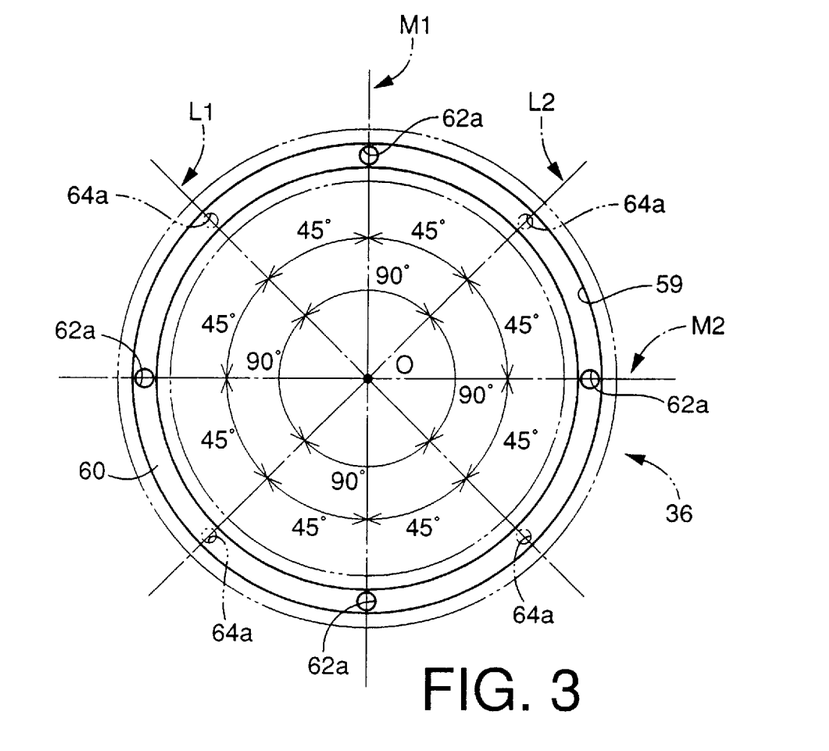
FIG. 3 is a view in cross section, corresponding to that of FIG. 2, showing a mold for molding a substrate of a disk, which is constructed according to another embodiment of this invention.

While the first preferred embodiment of the present invention described above is provided with the two fourth air passages 62 and the four air blow passages 64, the number of these elements is not specifically limited. For instance, four fourth air passages 62 may be provided in the movable mold half 12 such that the open ends 62a of the four fourth air passages 62 are located at the respective circumferential positions of the circumferential communication channel 60, as shown in FIG. 3. Namely, the open ends 62a of the four passages 62 are located at respective four points of intersection between the circumferential communication channel 60 and two mutually perpendicular straight lines M1 and M2 which pass the centerline 0 and which are at 45° with respect to the straight lines L1 and L2. This arrangement has substantially the same advantages as described above with respect to the first embodiment.

Figure 4:
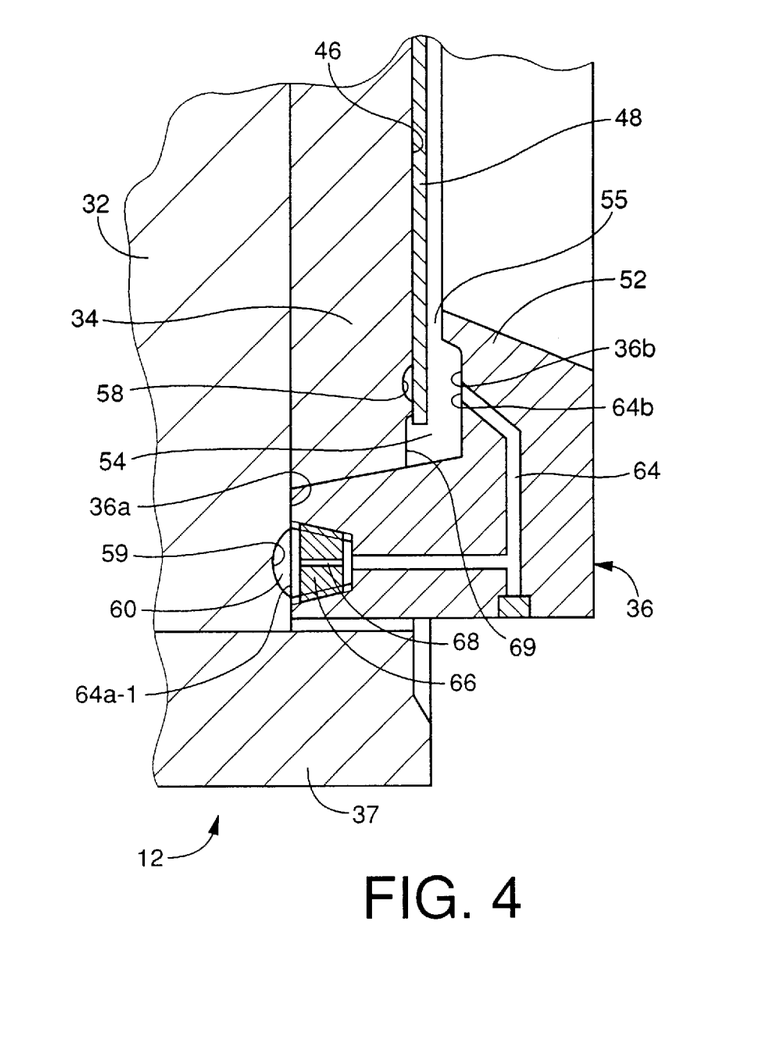
FIG. 4 is an enlarged view in vertical cross section showing a part of a mold for molding a substrate of a disk, which is constructed according to yet another embodiment of this invention.

Referring next to FIG. 4, there is shown a part of a mold for molding a substrate of an optical disk, which mold is constructed according to the second embodiment of the present invention. The mold of the second embodiment has the same construction as the mold of the first embodiment, except the part illustrated in FIG. 4.

The mold of the present embodiment includes the movable hold half 12 wherein the outer stamper holder 36 has four air blow passages 64 formed therethrough, such that air inlets 64a are open in the radially outer annular surface 36a, while the air outlets 64b are open in the radially inner annular surface 36b. To the air inlets 64a, there are screwed flow restrictors 66, respectively. Each flow restrictor 66 has a restrictor passage 68 which extends in the axial direction of the mold and has a cross sectional area which is smaller than that of the corresponding air blow passage 64, as shown in FIG. 4. The compressed air supplied to the communication channel 60 is fed to the respective air blow passages 64 through the respective restrictor passages 68.

In the mold of the second embodiment, the pressure of the compressed air introduced to the annular air chamber 54 through each air blow passage 64 is preferably adjusted or changed by selecting the flow restrictor 66, the restrictor passage 68 of which has a suitable cross sectional area.

The mold of the present embodiment is capable of adjusting the flow resistance of the air passages from the fourth air passages 62 to the air outlets 64b, by selecting the appropriate flow restrictors 66 attached to the air inlets 64a. Thus, the compressed air can be evenly injected from the air outlets 64b at a constant pressure into the annular air chamber 54, thereby providing the same advantages as in the first embodiment, such as prevention of the local sticking and bending of the molded disk substrate, even where only one fourth air passage 62 is provided as shown in FIG. 5.

Figure 5:
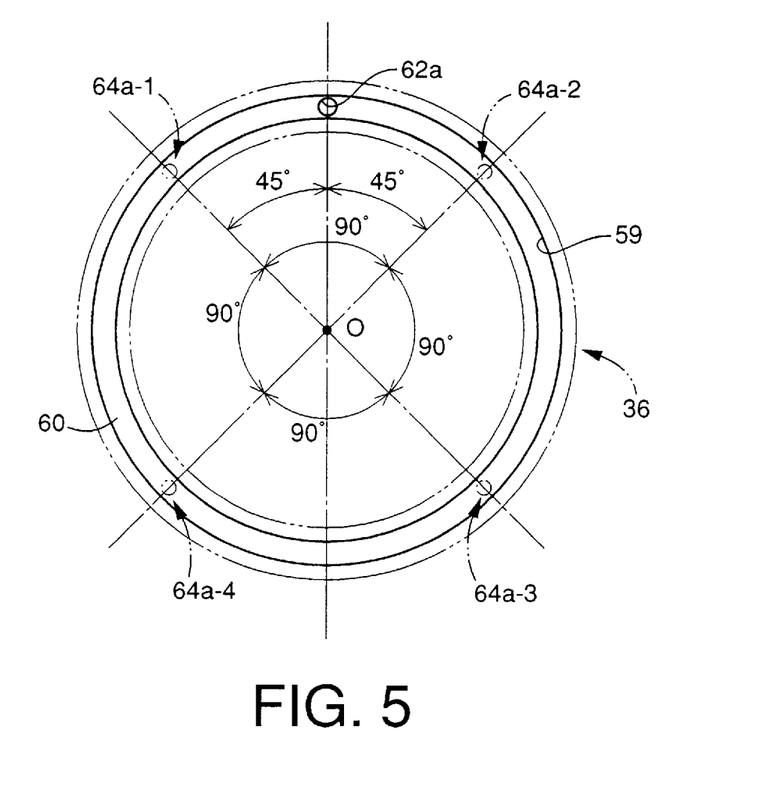
FIG. 5 is a view in cross section, corresponding to that of FIG. 2, schematically showing a part of the mold of FIG. 4.

In the arrangement of FIG. 5, the air inlets 64a of the four air blow passages 64 are open to the circumferential communication channel 60 at the respective circumferential positions. On the other hand, the single fourth air passage 64 is open to the communication channel 60, at its open end 62a positioned intermediate between the adjacent air inlets 64a-1 and 64a-2 in the circumferential direction of the communication channel 60 as shown in FIG. 5. In this case, the circumferential distance between the open end 62a of the passage 62 and the air inlets 64a-3, 64a-4 which are not adjacent to the open end 62a is longer than that between the open end 62a and the adjacent air inlets 64a-1, and 64a-2. Thus, the flow resistance of the air passages connecting the open end 62a and the air inlets 64a-3 and 64a-4 (hereinafter referred to as "second air passages") is larger than that of the air passages connecting the open end 62a and the air inlet holes 64a-1 and 64a-2 (hereinafter referred to as "first air passages"), due to the dimensional difference between these first and second air passages. The difference of the flow resistance between the first and second air passages may cause a pressure difference of the compressed air injected through the first and second air passages. To avoid this difference of pressure of the compressed air, the flow restrictors 66 are provided at the air inlets 64a-1 and 64a-2 which are closer to the open end 62a than the other air inlets 64a-3 and 64a-4 in the circumferential direction of the communication channel 60. Each flow restrictor 66 has a suitable flow resistance, so that the first and second air passages have the same flow resistance.

In the embodiment of FIG. 4, the movable mirror block 34 has an annular cutout 69 at the outer peripheral portion of the mirror surface. In other words, the outer peripheral portion of the mirror surface of the movable mirror block 34 is recessed to form an annular recess 69 having a depth in the axial direction of the mold. The stamper 48 is placed on the mirror surface of the movable mirror block 34 such that the outer periphery of the stamper 48 is positioned just above the annular cutout or recess 69. In this arrangement, the mirror surface of the movable mirror block 34 is effectively prevented from being scratched or damaged by burrs which may be formed on the outer periphery of the stamper 48, during manufacture of the stamper 48.

The use of the flow restrictors 66 permits the compressed air to be injected into the air chamber 54 under a substantially constant pressure at the air outlets 64b of the air blow passages 64. Moreover, the flow restrictors 66 may be used to deal with a change in the flow resistance of the air passages involved, which change occurs for some reason or other.

While the open end 62a of the single fourth air passage 62 and the air inlets 64a-1, 64a-2, 64a-3, 64a-4 of the four air blow passages 64 are open to the communication channel 60 at the appropriate circumferential portions of the communication channel 60, in the present embodiment, the numbers of these elements 62, 64 may be suitably selected. In the embodiment of FIGS. 4 and 5, the flow restrictors 66 are provided at the respective air inlets 64a-1 and 64a-2 which are adjacent to the open end 62a of the fourth air passage 62, so as to adjust the flow resistances at these air inlets 64a-1 and 64a-2, on the basis of the flow resistances at the air inlets 64a-3 and 64a-4 which are remote from the open end 62a. However, the air inlets at which the flow restrictors 66 are provided may be suitably selected. Further, the flow restrictors 66 may be provided for all air inlets 64a.

While the present invention has been described in detail in its presently preferred embodiments by reference to the accompanying drawings, for illustrative purpose only, it is to be understood that the invention is not limited to the detail of the illustrated embodiments.

While the principle of the present invention is applied to the air passages 62, 64 for applying air pressure to the radially outer portion of the molded disk substrate for facilitating the removal of the disk substrate from the movable mold half 12, in the illustrated embodiments, the principle of the present invention may be applied to air passages for applying the air pressure to a radially inner portion of the molded disk substrate. Further, the present invention may be applied to such air passages formed through the stationary mold half 10 for applying the air pressure to a desired portion of the molded disk substrate through a plurality of air outlets, for facilitating the removal of the disk substrate.

Figure 6:
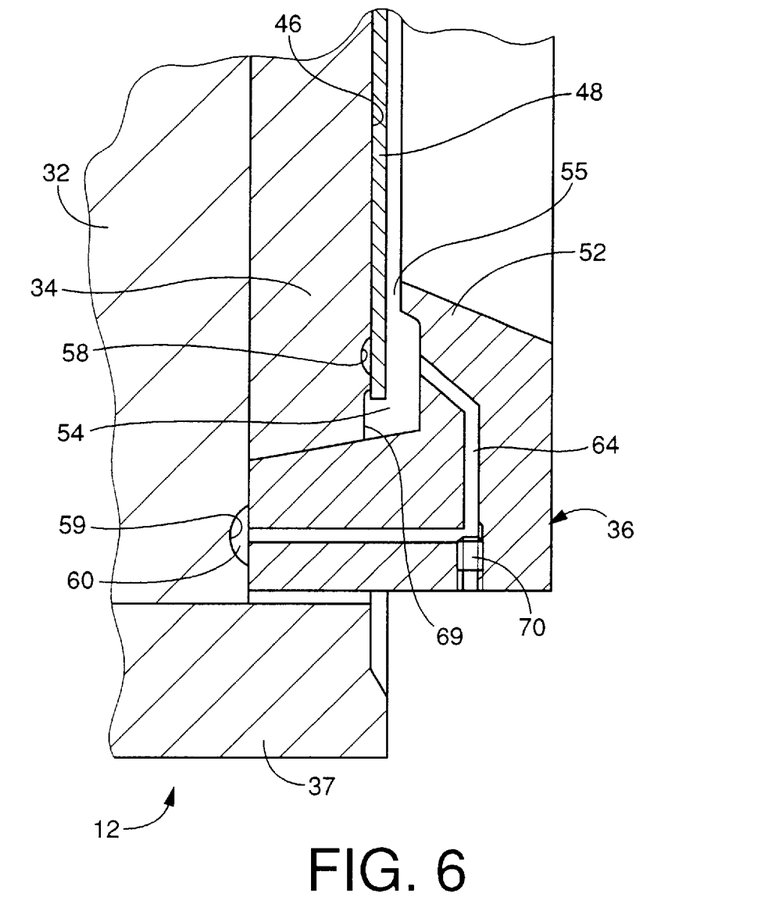
FIG. 6 is a view in vertical cross section, corresponding to that of FIG. 4, showing a part of a mold for molding a substrate of a disk, which is constructed according to a further embodiment of this invention.

In the second embodiment, the flow resistance of the air passages 64 is adjustable by using the appropriate flow restrictors at the air inlets 64a. However, the individual air passages may be formed with suitable cross sectional areas and lengths, so that the pressure of injection of the compressed air into the mold cavity 14 is substantially constant at all of air outlets which are suitably arranged in the circumferential direction of the mold. The flow restrictors 66 may be replaced by flow restrictors 70 illustrated in FIG. 6, each of which is screwed in the outer stamper holder 36 such that the axial end of the flow restrictor 70 partially defines the corresponding air blow passage 64. In this embodiment of FIG. 6, the cross sectional area of each air blow passage 64 can be adjusted by changing the amount of protrusion of the flow restrictor 70 into the air blow passage 64. Thus, the flow restrictor 70 is manually operable to change the resistance to the air flow through the air blow passage 64.

It is to be understood that the present invention may be embodied with various other changes, modifications and improvements, which may occur to those skilled in the air, in the light of the foregoing teachings, without departing from the spirit and scope of the invention defined in the following claims.

What is claimed is:

1. A mold for molding a substrate of a disk, comprising:
   a stationary mold half having a first molding surface; and
   a movable mold half movable relative to said stationary mold half and having a second molding surface cooperating with said first molding surface to define therebetween a mold cavity,
   each of at least one of said stationary and movable mold halves having at least one air supply passage for supplying compressed air, and a plurality of air blow passages having respective air inlets in communication with said at least one air supply passage and respective air outlets open to said mold cavity at respective circumferential positions of said mold cavity about a centerline of said mold, for introducing the compressed air from said at least one air supply passage into said mold cavity, to facilitate removal of the molded substrate from said at least one of said stationary and movable mold halves, wherein said at least one air supply passage and said air blow passages cooperate to provide a plurality of air passages ending at said air outlets, said plurality of air passages having a substantially same resistance to a flow of the compressed air therethrough and wherein said each of at least one of said stationary and movable mold halves further includes a circumferential communication channel communicating with an open end of each of said at least one air supply passage and said air inlets of said air blow passages, for thereby connecting said at least one air supply passage to said air blow passages, said air inlets being arranged in a circumferential direction of said circumferential communication channel such that said air inlets have a same circumferential distance from said open end of one of said at least one air supply passage.

2. A mold according to claim 1, wherein said air inlets of said air blow passages are equally spaced from each other in said circumferential direction, and said open end of each of said at least one air supply passage is located intermediately between adjacent ones of said air inlets.

3. A mold according to claim 1, wherein said each of at least one of said stationary and movable mold halves further includes a circumferential communication channel communicating with an open end of each of said at least one air supply passage and said air inlets of said air blow passages, for thereby connecting said at least one air supply passage to said air blow passages, at least one of said air blow passages having a flow restrictor for restricting a flow of the compressed air through each of said at least one of said air blow passages.

4. A mold according to claim 3, wherein said flow restrictor is manually operable for adjusting a resistance to a flow of the compressed air through said each of at least one of said air blow passages.

5. A mold according to claim 1, wherein one of said stationary and movable mold halves includes an annular outer stamper holder for holding a radially outer portion of an annular stamper to be set on one of said first and second molding surface which corresponds to said one of said stationary and movable mold halves, said annular outer stamper holder having said plurality of air blow passages and cooperating with a radially outer portion of said one of said first and second molding surfaces to define an annular air chamber to which said air outlets of said air blow passages are open, said annular outer stamper holder cooperating with an exposed surface of said stamper to define therebetween a circumferential clearance communicating with a radially inner end of said annular air chamber, whereby the compressed air injected from said air outlets into said air chamber is fed to said exposed surface of said stamper through said circumferential clearance.

6. A mold for molding a substrate of a disk, comprising:
a stationary mold half having a first molding surface; and
a movable mold half movable relative to said stationary mold half and having a second molding surface cooperating with said first molding surface to define therebetween a mold cavity, each of at least one of said stationary and movable mold halves having at least one air supply passage for supplying compressed air, and a plurality of air blow passages having respective air inlets in communication with said at least one air supply passage and respective air outlets open to said mold cavity at respective circumferential positions of said mold cavity about a centerline of said mold, for introducing the compressed air from said at least one air supply passage into said mold cavity, to facilitate removal of the molded substrate from said at least one of said stationary and movable mold halves, wherein said at least one air supply passage and said air blow passages cooperate to provide a plurality of air passages ending at said air outlets, said plurality of air passages having a substantially same resistance to a flow of the compressed air therethrough; and wherein said each of at least one of said stationary and movable mold halves includes a circumferential communication channel communicating with an open end of each of said at least one air supply passage and said air inlets of said air blow passages, for thereby connecting said at least one air supply passage to said air blow passages, at least one of said air blow passages having a flow restrictor for restricting a flow of the compressed air through each of said at least one of said air blow passages.

7. A mold according to claim 6, wherein said flow restrictor is manually operable for adjusting a resistance to a flow of the compressed air through said each of at least one of said air blow passages.

* * * * *